(12) United States Patent
Lucchetta (10) Patent No.: US 11,493,090 B2
(45) Date of Patent: Nov. 8, 2022

(54) BEARING CAGE

(71) Applicant: Edwards Limited, Burgess Hill (GB)

(72) Inventor: Emiliano Lucchetta, Burgess Hill (GB)

(73) Assignee: Edwards Limited, West Sussex (GB)

( * ) Notice: Subject to any disclaimer, the term of this patent is extended or adjusted under 35 U.S.C. 154(b) by 10 days.

(21) Appl. No.: 17/259,030

(22) PCT Filed: Jul. 9, 2019

(86) PCT No.: PCT/GB2019/051925
§ 371 (c)(1),
(2) Date: Jan. 8, 2021

(87) PCT Pub. No.: WO2020/012169
PCT Pub. Date: Jan. 16, 2020

(65) Prior Publication Data
US 2021/0270280 A1    Sep. 2, 2021

(30) Foreign Application Priority Data

Jul. 11, 2018 (GB) ..................................... 1811339

(51) Int. Cl.
*F16C 33/66* (2006.01)
*F04D 19/04* (2006.01)
(Continued)

(52) U.S. Cl.
CPC ........ *F16C 33/6651* (2013.01); *F04D 19/042* (2013.01); *F04D 29/056* (2013.01);
(Continued)

(58) Field of Classification Search
CPC .... F16C 33/3887; F16C 33/41; F16C 33/412; F16C 33/414; F16C 33/416; F16C 33/418;
(Continued)

(56) References Cited

U.S. PATENT DOCUMENTS 7,044,645 B2 * 5/2006 Yamamoto ............ F16C 33/418
384/531
2003/0021506 A1    1/2003 Wilm et al.
(Continued)

FOREIGN PATENT DOCUMENTS

CN    102242770 A    11/2011
CN    204677610 U    9/2015
(Continued)

OTHER PUBLICATIONS

Chinese Office Action dated Oct. 26, 2021 and Chinese Search Report dated Oct. 19, 2021 for corresponding Chinese application Serial No. CN2019800464488, 19 pages.
(Continued)

*Primary Examiner* — James Pilkington
(74) *Attorney, Agent, or Firm* — Theodore M. Magee; Westman, Champlin & Koehler, P.A.

(57) ABSTRACT

A bearing cage for a rotor bearing of a turbomolecular pump. The bearing cage includes a plurality of bearing pockets each of which, in use, houses a bearing ball such that the bearing ball operably engages an inner race and an outer race of the rotor bearing. Each bearing pocket of the bearing cage has a primary chamber for housing the bearing ball and each bearing pocket further includes a sump.

11 Claims, 4 Drawing Sheets

(51) Int. Cl.
*F04D 29/056* (2006.01)
*F04D 29/06* (2006.01)
*F16C 19/06* (2006.01)
*F16C 33/38* (2006.01)
*F16C 33/41* (2006.01)

(52) U.S. Cl.
CPC .............. *F04D 29/06* (2013.01); *F16C 19/06* (2013.01); *F16C 33/3887* (2013.01); *F16C 33/418* (2013.01); *F16C 33/6681* (2013.01); *F16C 2360/45* (2013.01)

(58) Field of Classification Search
CPC .............. F16C 33/6651; F16C 33/6681; F16C 33/6685; F16C 2237/00; F16C 2360/45
See application file for complete search history.

(56) References Cited

U.S. PATENT DOCUMENTS

| | | | |
|---|---|---|---|
| 2004/0141672 | A1 | 7/2004 | Naito et al. |
| 2006/0088238 | A1* | 4/2006 | Englander ............. F04D 29/059 384/625 |
| 2009/0220181 | A1 | 9/2009 | Yamada et al. |
| 2014/0348457 | A1* | 11/2014 | Docimo ................ F16C 19/163 384/499 |
| 2015/0226265 | A1* | 8/2015 | Bourgeois ................ B66C 1/62 29/259 |

FOREIGN PATENT DOCUMENTS

| | | |
|---|---|---|
| DE | 102010014321 A1 | 10/2011 |
| EP | 0810381 A1 | 12/1997 |
| EP | 2068018 * | 6/2009 |
| EP | 2068018 A1 | 6/2009 |
| EP | 3225863 A1 | 10/2017 |
| FR | 2348043 A1 | 11/1977 |
| JP | H08200376 A | 8/1996 |
| JP | 2002098150 A | 4/2002 |
| JP | 2004124954 A | 4/2004 |
| JP | 2008249127 A | 10/2008 |
| JP | 2009036222 A | 2/2009 |
| JP | 2013068249 A | 4/2013 |

OTHER PUBLICATIONS

British Examination Report dated Dec. 12, 2018 and Search Report dated Dec. 11, 2018 for corresponding British Application No. GB1811339.9.

PCT Notification of Transmittal of the International Search Report and the Written Opinion of the International Searching Authority, or the Declaration dated Sep. 25, 2019, PCT Search Report and Written Opinion dated Sep. 25, 2019 for corresponding PCT Application No. PCT/GB2019/051925.

Chinese Office Action dated Apr. 15, 2022 and Search Report dated Apr. 8, 2022 for corresponding Chinese application Serial No. 2019800464488, 17 pages.

* cited by examiner

BEARING CAGE

CROSS-REFERENCE OF RELATED APPLICATION

This application is a Section 371 National Stage Application of International Application No. PCT/GB2019/051925, filed Jul. 9, 2019, and published as WO 2020/012169 A1 on Jan. 16, 2020, the content of which is hereby incorporated by reference in its entirety and which claims priority of British Application No. 1811339.9, filed Jul. 11, 2018.

FIELD

The invention relates to a bearing cage and, in particular, to a bearing cage for use in an oil lubricated rotor bearing in a vacuum pump, particularly a turbomolecular pump.

BACKGROUND

Vacuum pumps typically comprise an impeller in the form of a rotor mounted on a shaft for rotation relative to a surrounding stator. The shaft is typically supported by a bearing arrangement comprising two bearings located at or intermediate respective ends of the shaft. Alternatively, the shaft may be a cantilever supported by two bearings located at or intermediate to one end of the shaft. In both arrangements, one or both bearings may be in the form of rolling bearings. For instance, the upper bearing may be a passive magnetic bearing, and the lower bearing a rolling bearing.

Figure 1:
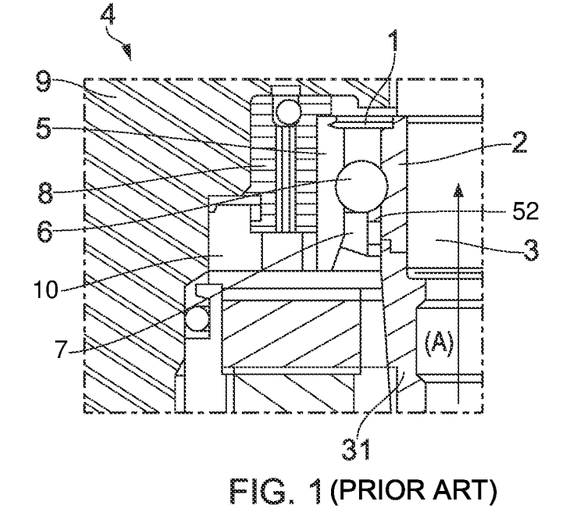
FIG. 1 shows a prior art oil lubricated bearing in situ in a turbomolecular pump.

Referring to FIG. 1, a typical rolling bearing (1) comprises an inner race (2) fixed relative to the shaft (3) of the vacuum pump (4), an outer race (5), and a plurality of rolling elements (6), supported by a bearing cage (7), for allowing relative rotation of the inner race (2) and the outer race (5). Typically, the outer race (5) is fixedly attached to a hearing support damper (8), which is in turn fixedly attached to the housing (9) of the vacuum pump. The bearing support damper (8) is typically held in place by a bearing support nut (10).

The rolling bearing (1) typically comprises a plurality of bearing balls (6), which can be grease or oil lubricated to establish a load-carrying film separating the bearing components in rolling and sliding contact, in order to minimise friction and wear.

As discussed, the rolling bearing (1) will typically comprise a bearing cage (7). As better illustrated by reference to FIGS. 2 and 3, the bearing cage (7) may comprise a plurality of evenly spaced bearing pockets (30) within which the bearing balls (6) are positioned. The bearing cage (7) thus ensures even spacing of the bearing balls (6) around the channel between the inner (2) and outer (5) races, and aids in oil lubricant distribution within the bearing.

Rolling bearings (1) are typically lubricated by an oil lubricant which forms a thin film between each bearing ball (6), its corresponding bearing pocket (30), and the inner (2) and outer (5) races. The lubricant film formed between the bearing balls (6) and the bearing cage (7) ensures that the bearing balls (6) can rotate and spin with minimal wear and reduced losses due to friction. The ball motion is complex and may include a combination of rolling around the bearing axis and spinning around other axes as a result of the bearing's internal geometry and the forces that the balls are subject during high speed operation.

FIG. 1 shows an outer piloted cage design in which the oil delivery nut (31), from an oil supply system, extends between inner race (2) and the bearing cage (7). Oil lubricant is supplied to the bearing balls (6) through a channel (52) between the inner race (2) and the bearing cage (7).

FIG. 1 shows turbomolecular pump in a vertically upright position with the axis (A) of rotation of the impeller shaft (3) in a substantially vertical orientation. When in a vertically upright position the rotor chamber is positioned with the rotor chamber inlet above the rotor chamber outlet.

Figure 2:
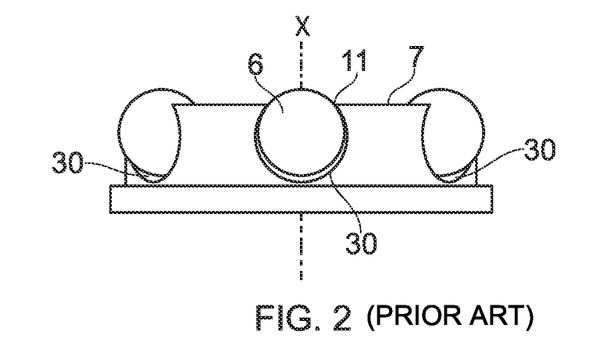
FIG. 2 shows a prior art oil lubricated bearing in a vertically upright orientation.

FIG. 2 shows a bearing cage (7) and bearing balls (6) as found in a lower rolling bearing of a turbomolecular pump that is in a vertically upright position. As illustrated, the axis of rotation (X) of the bearing cage (7) is vertically oriented, and the bearing cage (7) is positioned such that the opening (11) at a first end of each bearing pocket (30) is facing upward. Under the action of gravity, the bearing cage (7) will tend to sit such that each bearing ball (6) is located more towards the first end of its bearing pocket (30) where a oil lubricating film may thus form. When in this orientation, the interaction between each bearing ball (6) and the opening (11) of its bearing pocket (30) interrupts the oil lubricant film and thereby reduces frictional losses when the vacuum pump is in operation. The opening (11) is typically a feature of 'clip'on' cages where there is an open side to allow the cage to be clipped on the balls once the balls have been preassembled in between the races. An opening may be provided in deep groove ball bearings because during assembly the balls can be unequally spaced. In alternative designs, such as riveted ball bearings or angular contact ball bearings, there may be no open side For operational reasons, vacuum pumps, including turbomolecular pumps, may need to be used in orientations other than the vertically upright position described above, for instance with the axis of the impeller horizontal, vertically inverted (that is to say with the rotor chamber outlet above the inlet), or at any angle therebetween. It has, however, been observed that when vacuum pumps are orientated in positions other than the vertically upright position, then the operating temperature for a given rotor speed may increase, reducing the operational range of the vacuum pump, and the power required to run the vacuum pump at a given rotor speed may increase, or vice versa wherein the increased power losses lead to increased temperatures within the bearing. These problems, known as parasitic losses, have been found to be particularly acute when the pump is arranged in a vertically inverted position. The power losses due to friction within hearing have been measured to increase by as much as 100% in some orientations.

There is therefore an ongoing need for vacuum pumps with reduced parasitic losses and, in particular, vacuum pumps comprising oil lubricated in which power loss is independent of the orientation of the device.

The inventors have discovered that a cause of these problems is viscous losses in the bearing cage of the lower oil lubricated rolling bearing (i.e. the rolling bearing located at a rotor chamber outlet end of a turbomolecular pump).

Figure 3:
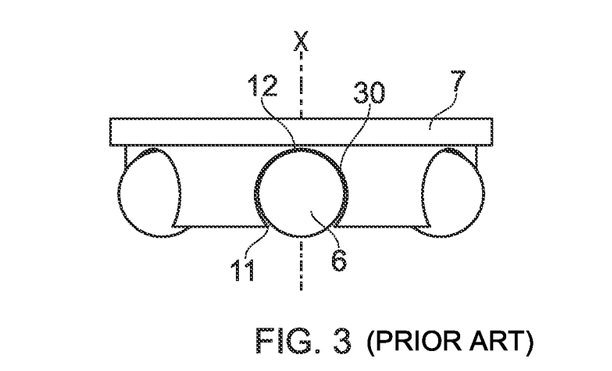
FIG. 3 shows a prior art oil lubricated bearing aligned in a vertically inverted orientation.

FIG. 3 shows a bearing cage (7) and bearing balls (6) as found in a lower rolling bearing of a turbomolecular pump that is in a vertically inverted position. As shown, the axis of rotation (X) of the bearing cage (7) is vertical however the bearing cage (7) is inverted compared to the arrangement illustrated in FIGS. 1 and 2. In this position, the bearing cage (7) is positioned such that the opening (11) of bearing pocket (30) is facing downward.

It has been found that in this position, under the action of gravity, the bearing cage (7) may tend to sit such that each bearing ball (6) is located more towards the second, closed end (12) of its bearing pocket (30). As a result, the surface of the closed end of the bearing pocket (12) is located significantly closer to the bearing ball (6) than when in the vertically upright position. The oil lubrication thickness is thus reduced at the closed end (12) of the bearing pocket (30) and is not interrupted by the opening (11) of the bearing pocket, resulting in higher viscous losses.

Similar issues can occur in other non-vertical orientations, although to a lesser extent.

The present invention addresses these and other problems with the prior art oil lubricated bearing systems.

The discussion above is merely provided for general background information and is not intended to be used as an aid in determining the scope of the claimed subject matter. The claimed subject matter is not limited to implementations that solve any or all disadvantages noted in the background.

SUMMARY

Accordingly, in a first aspect the present invention provides a bearing cage for an oil lubricated rotor bearing of a turbomolecular pump. The bearing cage comprises a plurality of bearing pockets each of which, in use, houses a bearing ball such that the bearing ball may operably engage an inner race and an outer race of the rotor bearing. Each bearing pocket having a primary chamber for housing the bearing ball, wherein each bearing pocket further comprises an oil sump.

For the purpose of the invention, sump has its normal meaning. Typically, a hollow into which, in use, a lubricating liquid oil may flow from the primary chamber. Grease lubricated bearings are known to have grease sumps configured for holding substantially solid grease, but the present invention is not for use with such grease lubricated bearings.

Typically, the sump is located at a second end of the pocket opposite a first end. Typically, the first end of each pocket comprises an opening. The width of the opening is typically the same or wider than the width of the opening of the sump. Typically, the width of the opening is narrower than the diameter of the bearing ball.

Typically, the openings at the first end of each pocket are defined in a substantially annular surface of the bearing cage.

The inventors have found that providing an oil sump in each bearing pocket reduces viscous losses, particularly when the bearing cage is orientated such that the bearing pocket openings are facing downward. Advantageously, when a bearing cage according to the invention is employed in an oil lubricated lower rolling bearing in a turbomolecular pump, when the pump is operated in a vertically inverted position, parasitic losses are significantly reduced compared to when a standard bearing cage is employed. Additionally, and advantageously, the amplitude of cage vibrations during operation has been found to be reduced.

The primary chamber may be at least partially defined by a substantially arcuate surface which encloses a portion of a bearing ball housed therein. The primary chamber may comprise two or more arcuate surfaces. Typically, the arcuate surface(s) have an arc defined by the circumference imaginary circle. Where the primary chamber comprises two or more arcuate surfaces they are defined by the circumference of the same imaginary circle.

In embodiments, the substantially arcuate surface(s) defining the primary chamber may be in the form of part of an outer surface of imaginary cylinder with a central axis radially aligned with the axis of rotation of the bearing cage. The radius of the substantially arcuate surface defining the primary chamber may be the radius of the bearing ball plus a small clearance to allow for rotation of the bearing balls and for the formation of an oil lubricating layer. The radius of the substantially arcuate surface defining the primary chamber may be from about 0.25 mm to about 6 mm, preferably from about 1 mm to about 5 mm.

The sump may be in the form of a secondary chamber extending radially outwardly from the substantially arcuate surface defining the primary chamber.

Typically, each pocket comprises an opening at the first end defined in a substantially annular surface of the bearing cage. Typically, each pocket comprises two pocket jaws defining the opening at the first end of the pocket. The substantially arcuate surface and the annular surface may be contiguous. Typically, the pocket jaws comprise the edge where the substantially arcuate surface and the annular surface meet.

The bearing pockets may be substantially uniformly circumferentially separated.

In use, a bearing ball may be housed within each bearing pocket, such that the bearing ball is at least partially enclosed within the primary chamber. Oil lubricant may sit between the outer surface of the bearing ball and the surface of the primary chamber, and within the sump. The oil lubricant acts to reduce friction and wear of the bearing components by supporting and separating the bearing balls from the bearing cage, the inner race, and the outer race. Additionally, the oil lubricant prevents oxidation and/or corrosion of the bearing balls, acts as a barrier to contaminants, and conducts heat away from the bearing. Typically, the oil lubricant may flow out of the sump to substantially prevent compression of an oil lubricant film between ball and the sump surface.

In use, oil lubricant may be fed to the bearing by an oil delivery nut. The oil lubricant may be delivered to the oil delivery nut via a wick from a felt oil reservoir.

Typically, the first end is a rotor-side end and the second end is a pump outlet-side end.

The sump may extend to an outer race-side surface of the bearing cage. Additionally, or alternatively, the sump may extend to an inner race-side surface of the bearing cage.

In embodiments, the sump is open-sided. Open-sided refers to a configuration wherein the sump extends the width of the bearing cage wall without interruption. Beneficially, an open-sided sump is simple to manufacture.

In embodiments, the sump may not extend the full width of the bearing cage. For instance, the sump may be open on only one of the inner race-side or outer race-side. The sump may be defined on an inner race-side and/or an outer race side by a wall extending longitudinally from a base of the sump. The thickness of the wall may be between about 1 mm and about 6 mm depending on the bearing size and design.

The longitudinally extending wall may comprise a bearing ball-side surface which forms part of the substantially arcuate surface defining the primary chamber.

Advantageously, sumps that do not extend the full width of bearing cage wall better retain oil lubricant during use. Without wanting to be bound by theory, it is believed that employing a wall limits the movement of oil lubricant out of the sump as a result of centrifugal forces acting on the oil lubricant when in use.

In embodiments, the sump may be defined by a substantially arcuate surface. Typically, a single substantially arcuate surface. The substantially arcuate surface may have a substantially uniform radius across the width of the sump. The substantially arcuate surface may therefore form of a portion of the outer surface an imaginary cylinder with a central axis radially aligned with the axis of rotation of the bearing. Alternatively, the radius of the substantially arcuate surface of the sump may vary across the width of the sump. The arc will typically form part of an imaginary circle across the width of the sump, i.e. the radius of the arc may vary across the width of the sump but may not vary about a circumference of the sump.

The radius of the substantially arcuate surface of the sump is typically from about 0.5 mm to about 10 mm, preferably from about 0.75 mm and about 2 mm, an example being 0.9 mm. As with the other specific dimensions defined herein, the skilled person will appreciate that this invention can be applied to many different bearing sizes, and that while these dimensions are preferred they are not limiting.

Typically, although not exclusively, the substantially arcuate surface defining the sump may have a radius that is less than the radius of a substantially arcuate surface defining the primary chamber.

The radius of the substantially arcuate surface defining the primary chamber may be from about 0.25 mm to about 6 mm.

Typically, the substantially arcuate surface defining the sump and a surface defining the primary chamber, for instance the one or more substantially arcuate surfaces, are contiguous. The surface defining the primary chamber and the surface defining the sump may meet at an edge. Alternatively, the intersection between the surface defining the primary chamber and the surface defining the sump may be radiused.

In embodiments, the sump may comprise a surface, e.g. a base, which is substantially tangential to the axis of rotation of the bearing cage. The sump may for instance have a planar base. The base of the sump may be joined to primary chamber by one or more side-walls. Typically, the side walls will intersect the base at an angle of 85 degrees or greater, typically 90 degrees or greater. 90 degrees being an example. Alternatively, the sidewalls may intersect each other at the base of the sump.

Typically, in use, a portion of a bearing ball may extend through an opening of the bearing pocket and/or into the sump. Preferably, sump is configured such that the bearing ball is prevented from engaging a surface defining the sump. This ensures that the oil lubricant layer formed between the surface of the bearing ball and the surface of the primary chamber remains interrupted.

Typically, the bearing cage may be configured to comprise from six to eleven bearing pockets, preferably six bearing pockets. Each bearing pocket typically houses a single bearing ball.

In a further aspect, the present invention provides a oil lubricated rolling bearing for a turbomolecular pump comprising an inner race, an outer race, a plurality of bearing balls, and a bearing cage as disclosed in earlier aspects of the invention. Beneficially, such a rolling bearing may be retrofitted to a turbomolecular pump comprising a bearing oil lubrication system.

Typically, in use, the rolling bearing is orientated such that an axis of rotation of the rolling bearing is substantially the same as an axis of rotation of a rotor of the turbomolecular pump. Typically, the rolling bearing is the lower bearing of the turbomolecular pump.

In a further aspect, the present invention provides a turbomolecular pump comprising an oil lubricated rolling bearing comprising a bearing cage according to earlier aspects of the invention. Beneficially, such an oil lubricated turbomolecular pump may be used in any orientation In a further aspect, the present invention provides a method of converting a turbomolecular pump comprising an oil lubricated bearing for use in a position other than vertically upright, preferably for use in a vertically inverted position, the method comprising the steps of removing the rolling bearing; replacing the rolling bearing with a ball bearing comprising a bearing cage comprising a plurality of bearing pockets each containing a bearing ball, wherein each bearing pocket comprises a sump.

In yet a further aspect, the present invention provides the use of an oil rolling bearing comprising a bearing cage according to earlier aspects of the invention in a turbomolecular pump.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE FIGURES

Preferred features of the present invention will now be described, by way of example, with reference to the accompanying drawings, in which.

DETAILED DESCRIPTION

The invention provides a bearing cage for an oil lubricated rotor bearing in a turbomolecular pump.

Figure 4:
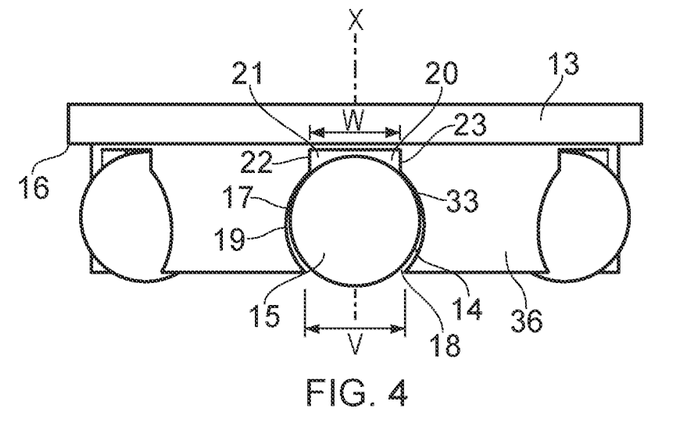
FIGS. 4 and 5 show a bearing cage according to the invention.

With reference to FIG. 4, in an example, the bearing cage (13) comprises a plurality of bearing pockets (14), each of which is configured to house a bearing ball (15). The bearing pockets (14) are circumferentially uniformly separated and, in use, the bearing cage (13) maintains the circumferentially uniform separation of the bearing balls (15).

The bearing cage (13) is a substantially cylindrical tube. Preferably, the bearing cage has an inner radius (r) of from about 2.5 mm to about 6.5 mm. 3.5 mm being an example. Typically, the bearing cage has a wall thickness (t) of from about 1 mm to about 6 mm.

The bearing cage (13) has a piloting flange (16) extending radially outwardly from the bearing cage (13). In use, the piloting flange (16) slidably engages the outer race of the bearing (not shown), to maintain the radial position of the bearing cage (13) about the axis of rotation of the rotor shaft of the turbomolecular pump.

The bearing cage may be manufactured from any suitable material, typically high-performance polymers selected from a list comprising phenolics, polyamide-imide, polyether ether ketone (PEEK), and polytetrafluoroethylene (PTFE). The bearing cage, including the pockets and sumps, may be manufactured by machining, injection moulding, by an additive manufacturing technique, or by a combination thereof.

Each bearing pocket (14) comprises a primary chamber (17). The primary chamber has an open end (18) defined in an annular surface (32) of the bearing cage (13). The primary chamber (17) is defined by a substantially arcuate surface (19) which encloses a portion of the bearing ball (15) housed therein. As illustrated, each bearing ball protrudes radially outwardly from the bearing cage so that it may operably engage the outer race. Similarly, each bearing ball protrudes radially inwardly so that it may operably engage the inner race. Each bearing ball also protrudes through the opening of its pocket and into the oil sump. The amount by which the bearing ball protrudes in any direction may vary in use depending, for instance, upon the orientation of bearing.

Each bearing pocket (14) further comprise an oil sump (20). The illustrated oil sump (20) is in the form of a secondary chamber extending radially outwardly from the substantially arcuate surface (19) defining the primary chamber (17), opposite the open end (18).

In the illustrated example, the width (w) of the sump (20) less than the width of the opening (v). Preferably the width of the sump (w) is less than the diameter of the bearing ball housed in the primary chamber.

The illustrated sump (20) has a rectangular cross-section. Sumps may have any cross-section, although preferably a rectangular, acute trapezoid, triangular, or arcuate (e.g. circular or elliptical) cross-section.

Figure 5:
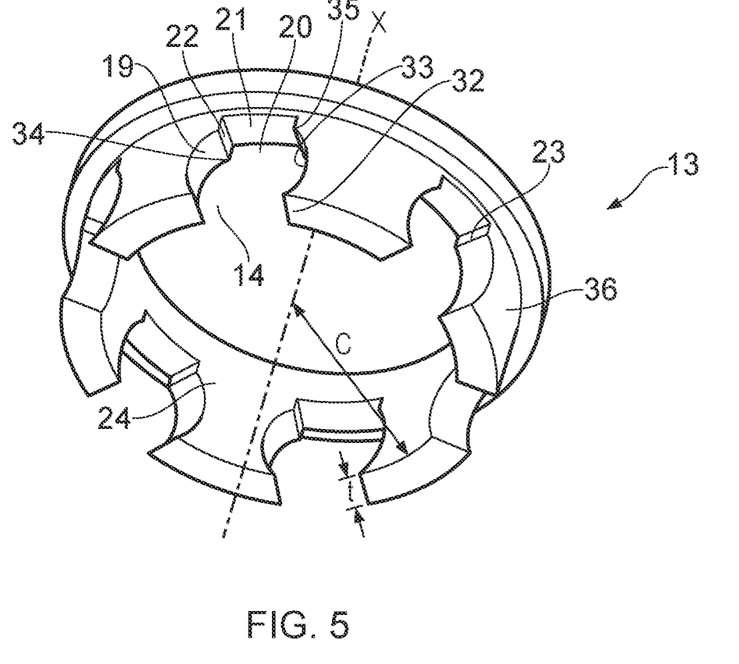

The sump (20) in FIGS. 4 and 5 has a base defined by a surface (21) which is substantially tangential (radial) to the axis of rotation (X). The sump (20) is further defined by a pair of sidewall surfaces (22, 23) in a substantially face-to-face orientation substantially perpendicular to the surface tangential to the axis of rotation (21). The sidewall surfaces (22, 23) extend longitudinally between the surface tangential to the axis of rotation (21) and the substantially arcuate surfaces (19, 33) defining the primary chamber (17). In this embodiment, the intersections between the substantially arcuate surface (19, 33) and the sidewall surfaces (22, 23) are defined by edges (34, 35). If preferred, these intersections may be radiused.

The illustrated sump (20) extends to both the inner race-side surface (24) and outer race-side surface (36) of the bearing cage (13). Thus, the sump (20) is open-sided.

FIG. 4 shows the bearing cage (13) in a vertically inverted position: the axis of rotation (X) is vertical, and that the sump (20) is positioned vertically above the open end (18). In this configuration, the effect of gravity acting on the bearing cage (13) is such that the bearing ball (15) extends partially into the sump (20). The bearing ball does not engage with the surface substantially tangential to the axis of rotation (21) or the side walls (22, 23). Advantageously, the presence of the sump (20) interrupts the lubricant layer formed between the bearing ball (15) and the primary chamber (17). This renders the power loss attributable to the bearing cage (13) substantially independent of the bearings orientation. As such, any vacuum pump comprising a bearing cage (13) as shown, is not limited by the bearing cage to any specific orientation.

FIG. 5 shows the bearing cage (13) of FIG. 4 from a different perspective.

Figure 6:
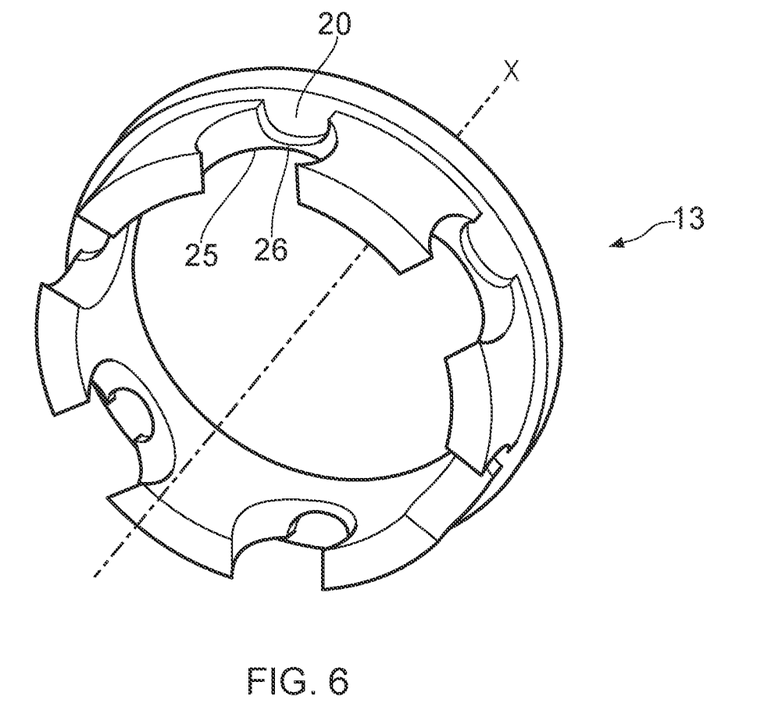
FIG. 6 shows an alternative bearing cage according to the invention.

FIG. 6 shows an alternative bearing cage (13) to that shown in FIGS. 4 and 5. In this instance, the sump (20) further comprises and is defined on an inner race-side by a wall (25) extending longitudinally from a base thereof. The wall (25) extends across the full width of the sump (20).

In this embodiment the longitudinally extending wall (25) has a bearing ball-side surface (26) which forms part of the substantially arcuate surface (19) defining the primary chamber (17). In this embodiment, the longitudinally extending wall (25) and the substantially arcuate surface (19) defining the primary chamber (17) are contiguous, with a substantially constant radius. This radius is constant across the width of the primary chamber.

Figure 7:
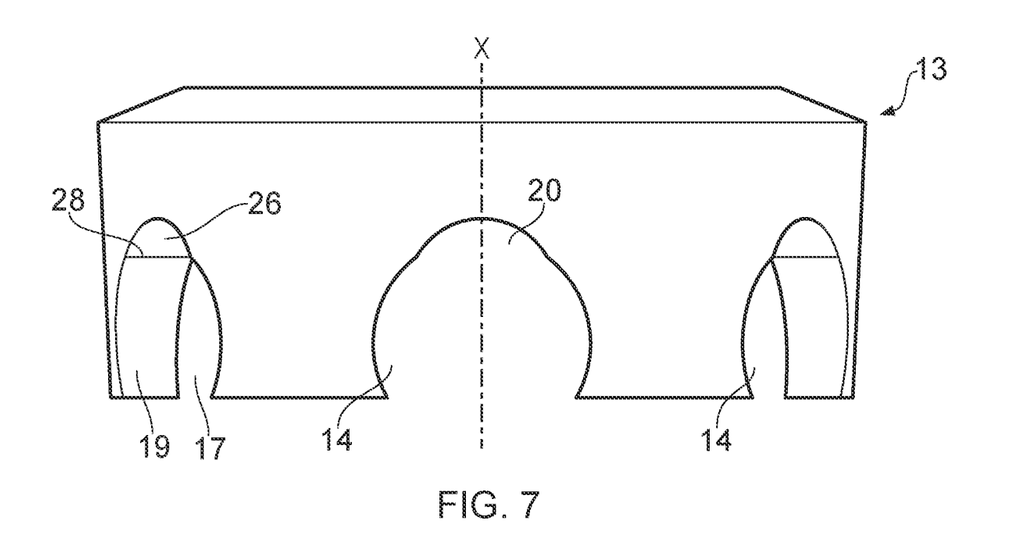
FIGS. 7 and 8 show an alternative beating cage according to the invention.

FIG. 7 illustrates a further alternative bearing cage (13). The sump (20) is similarly in the form of a secondary chamber extending radially outwardly from the substantially arcuate surface (19) defining the primary chamber (17) opposite the open end (18) of the bearing cage pocket (14). The sump (20) is open-sided and defined by a substantially arcuate surface (26).

The substantially arcuate surface (26) defining the sump (20) typically has a radius that is less than the radius of the substantially arcuate surface (19) defining the primary chamber (17). In this example, the diameter (27) of an imaginary circle defining the substantially arcuate surface (26) of the sump (20) is 0.7 times the diameter of an imaginary circle defining the substantially arcuate surface defining the primary chamber. Typically, a ratio from about 0.5 to about 0.9 is preferred.

As illustrated, the substantially arcuate surface (19) defining the primary chamber (17) and the substantially arcuate surface (26) defining the sump (20) are contiguous and their intersection (28) is defined by an edge. The intersection can be radiused if desired.

Figure 8:
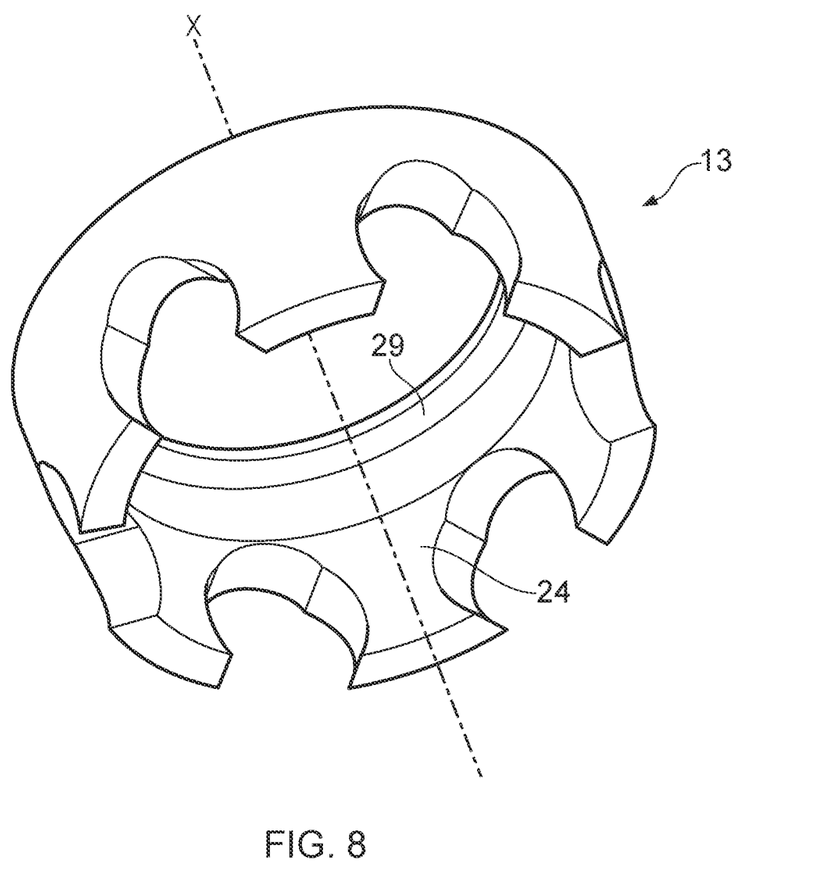

FIG. 8 illustrates the bearing cage (13) of FIG. 7 viewed from an alternative perspective. The bearing cage (13) comprises an inner piloting flange (29), extending radially inwardly from the internal surface of the bearing cage (24) towards the axis of rotation. The inner piloting flange (29) is configured to, in use, slidably engage with the inner race of the bearing to maintain the radial position of the bearing cage about the axis of rotation.

It is noted that the invention disclosed herein may be employed equally with an outer piloting design or an inner piloting design bearing cage.

It will be appreciated that various modifications may be made to the embodiments shown without departing from the spirit and scope of the invention as defined by the accompanying claims as interpreted under patent law.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed:

1. A bearing cage for an oil lubricated rotor bearing of a turbomolecular pump wherein the bearing cage comprises a plurality of bearing pockets each of which, in use, houses a bearing ball such that the bearing ball operably engages an inner race and an outer race of the rotor bearing, each bearing pocket comprising:

a primary chamber for housing the bearing ball, wherein the primary chamber is at least partially defined by two arcuate surfaces having a first radius and extending from an opening of the primary chamber at a first end of the primary chamber; and an oil sump in the form of a secondary chamber located at a second end of the primary chamber that is opposite the first end of the primary chamber, wherein the secondary chamber is defined by a single arcuate surface that has a constant second radius that is less than the first radius and wherein the single arcuate surface intersects the two arcuate surfaces of the primary chamber, and wherein at least one of a first side and a second side of the oil sump is open.

2. The bearing cage according to claim 1, wherein the first end is a rotor-side end and wherein the second end is a pump outlet-side end.

3. The bearing cage according to claim 2 wherein the opening at the first end is defined in a substantially annular surface of the bearing cage.

4. The bearing cage according to claim 1 wherein the oil sump is open on the first side.

5. The bearing cage according to claim 1 wherein the oil sump is open on the second side.

6. The bearing cage according to claim 1 wherein the oil sump is open only on one of the first side and the second side.

7. The bearing cage according to claim 1 wherein the oil sump is defined on the first or the second side by a wall extending longitudinally from a base thereof and wherein the longitudinally extending wall comprises a bearing ball-side surface which forms part of the two arcuate surfaces defining the primary chamber.

8. The bearing cage according to claim 1 wherein, in use, a portion of a bearing ball extends through the opening of the primary chamber and/or into the oil sump.

9. An oil lubricated rolling bearing for a turbomolecular pump comprising an inner race, an outer race, a plurality of bearing balls, and a bearing cage according to claim 1.

10. A turbomolecular pump comprising an oil lubricated rolling bearing according to claim 9.

11. A method for converting a turbomolecular pump comprising an oil lubricated roller bearing for use in a vertically inverted orientation, or a non-vertical orientation, the method comprising the steps of:
   a. removing the rolling bearing; and
   b. replacing the rolling bearing with a ball bearing comprising a bearing cage, wherein the bearing cage comprises a plurality of bearing pockets each containing a bearing ball, characterised in that each bearing pocket of the replacement bearing comprises:
   a primary chamber for housing the bearing ball, wherein the primary chamber is at least partially defined by two arcuate surfaces having a first radius and extending from an opening of the primary chamber at a first end of the primary chamber; and
   an oil sump having a first side and a second side, wherein the oil sump is in the form of a secondary chamber located at a second end of the primary chamber that is opposite the first end of the primary chamber, wherein the secondary chamber is defined by a single arcuate surface that has a constant second radius that is less than the first radius and wherein the single arcuate surface intersects the two arcuate surfaces of the primary chamber, and wherein at least one of the first side and the second side of the oil sump is open.

* * * * *